Figures 1, 2:
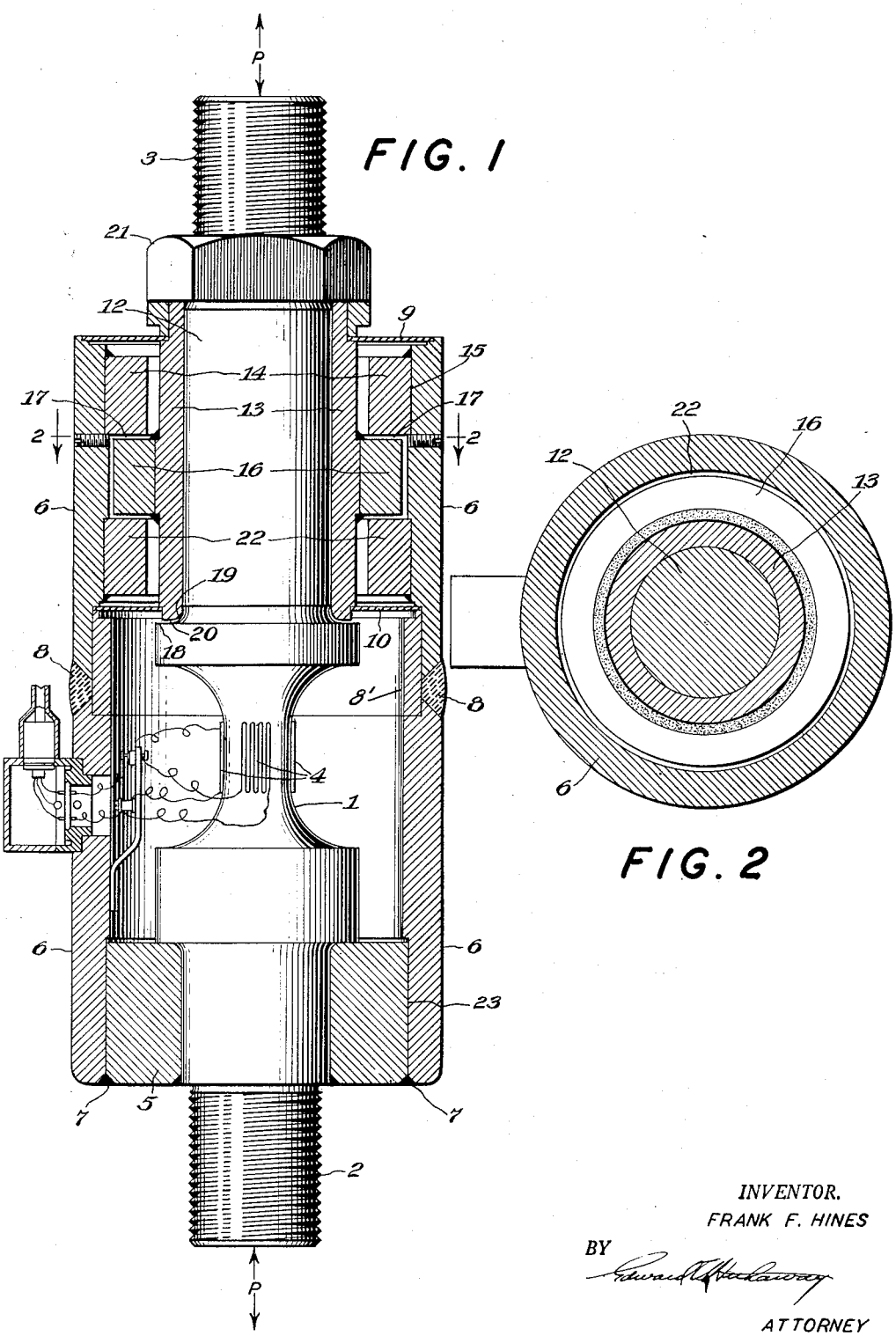

Jan. 1, 1957    F. F. HINES    2,775,887
LOAD CELL TYPE DYNAMOMETER WITH OVERLOAD PROTECTION MEANS
Filed June 11, 1953

INVENTOR.
FRANK F. HINES
BY
ATTORNEY 2,775,887

LOAD CELL TYPE DYNAMOMETER WITH OVERLOAD PROTECTION MEANS

Frank F. Hines, Arlington, Mass., assignor to Baldwin-Lima-Hamilton Corporation, a corporation of Pennsylvania Application June 11, 1953, Serial No. 360,935

4 Claims. (Cl. 73—141)

This invention relates to dynamometers of the general type disclosed in Ruge Patent No. 2,576,417 where a load sensing element is employed as a tension measuring device and it is an object of my invention to provide improved safety means for maintaining the load carrying ability of the device even though the load sensing element fails mechanically due to excessive overload.

Another object is to provide in a weighing device of the tension column type an improved safety means that is extremely simple and yet is highly effective, compact and economical in construction, operation and maintenance.

This invention is particularly valuable in connection with hazardous applications such as dynamometers used for crane scales and the weighing of molten metal ladles where mechanical failure of the dynamometer can result in serious damage and even loss of life. Heretofore yokes and other safety arrangements have been proposed but they were deficient in many respects including structural complications and expense.

Other objects and advantages will be more apparent to those skilled in the art from the following description of the accompanying drawings in which:

Fig. 1 is a vertical section of a dynamometer of the type described showing my novel protection device formed as an integral cooperative part of the dynamometer; and Fig. 2 is a section taken along the line 2—2 of Fig. 1.

In Fig. 1, I show a load weighing device in the form of a tension-compression dynamometer which is especially adapted for crane scale service where it acts in tension to weigh a load suspended beneath it. A load sensitive element 1 which in this case is a solid elastic metal cylindrical column is provided for convenience with integral ends 2 and 3. Column 1 is reduced in cross section so as to provide suitable strain sensitivity at that point and is equipped with suitable electrical impedance strain measuring means, preferably bonded wire type strain gages 4 which serve to provide a measure of the axially applied load P acting on the dynamometer, in accordance with principles which are well known to the art. Any other form of load sensing device can be used in place of column 1, as will be readily seen from reference to Ruge Patent No. 2,472,047 and other dynamometer art.

The load sensing member 1 is supported on a base 5 and is here shown terminated in threaded section 2 for convenience in attaching to the load applying means such as a crane hook (not shown). Extending axially from base 5 is a supporting member or casing 6 which for convenience is made in the form of a hollow tube. Casing 6 is preferably attached to base 5 by welding along line 7 or by brazing over area 23. It will be noted that the casing is made up of two sections which are welded together at seam 8 after final assembly; or, if desired, the casing may be an integral piece attached to the base by welding as shown in Ruge Patent No. 2,561,318. The two sections of casing 6 are preferably aligned by a sleeve 8' whose upper end is firmly seated against the outer edge of lower diaphragm 10.

Sensitive member 1 is supported laterally by the casing through two axially spaced, preferably annular, flexure members 9, 10 which are connected to the casing by some secure means such as brazing, welding, etc., and to a unit consisting of a cylindrical section 12 and an annular sleeve 13 in press fit engagement with each other so as to act as a single axially movable member which is in load transmitting contact with sensitive member 1 preferably by member 12 being formed integrally therewith. Flexure members 9, 10 are strongly connected to sleeve 13 of the piston by welding or brazing or other suitable means so that they support the axially movable unit laterally and guide it, during axial movement within the cylinder casing 6, in such a way that only the axial component P of load acting on the load cell is transmitted to the sensitive element 1 substantially independent of any side load or moments which may be applied. For convenience, member 12 and threaded end 3, as well as end 2, are made integral with sensitive member 1.

Now it may be seen that if member 1 were to fail due to excessive overload or possibly due to some hidden flaw in the metal, the device as just described would fail completely since flexure members 9 and 10 are purposely designed to offer relatively little resistance in the axial direction of the cell. In order to overcome this deficiency I provide a highly compact and effective safety load carrying member 14, preferably annular, which is secured to the interior of casing 6 by some such means as welding or by brazing along area 15 and a cooperating safety load carrying member 16, preferably annular, which is secured to the axially movable unit by welding or brazing or otherwise attaching to sleeve 13, members 14 and 16 being separated by a space 17 which is greater than the movement which would take place between them as a result of normal strain responsive operation of the device within its safe load carrying capacity.

Now if member 1 fractures under a tension load P the axially movable unit will merely move axially relative to casing 6 until members 14 and 16 come into contact and thus carry the total applied load over and above what little load is supported by flexure members 9, 10.

In the particular construction shown in Fig. 1 where member 12 is press fitted into tubular sleeve member 13, I provide the additional protection of shoulder 18 which is adapted to bear against end 19 of member 13 should the applied overload exceed the ability of the press fit to transmit the total load to protecting members 14, 16. While it is immaterial whether or not shoulder 18 normally bears against surface 19, I prefer to provide a small clearance 20 so that the assembly of the device is not a critical matter involving close dimensional tolerances. In a further extension of my present invention I provide overload safety means 22 similar to means 14 which will prevent overall failure of the device in the event of excessive overload in a compression direction. Here, some such means as a nut 21 on member 3 would be used to prevent possible slipping of the press fit of member 12 within sleeve 13.

Thus it may be seen that I have provided a very simple and economical, yet highly effective, overload protection means all of which can be built in a highly compact manner inside the body of my load cell without in any way interfering with its normal action and without taking up any additional space external of the dynamometer and yet, in the event of failure of the load sensitive column, the cylindrical casing 6 with its inherent structural strength carries the excessive load.

It will, of course, be understood that various changes in details of construction and arrangement of parts may be made by those skilled in the art without departing from the spirit of the invention as set forth in the appended claims.

I claim:

1. A load weighing device comprising, in combination, a base, a hollow supporting structure having a lengthwise axis which extends substantially at right angles to the base and is connected thereto for transmitting a force in such axial direction, an axially extending load transmitting unit spaced from said base, a load sensitive element having ends that are relatively axially movable in response to load, said ends respectively having load transmitting connection with said base and unit to transmit axial forces from one to the other, whereby the sensitive element is operated in accordance with load acting on said unit and on the other end of the load sensitive element, a plurality of axially spaced flexure members operatively connected to said supporting structure and to said unit, said flexure members being axially flexible but relatively radially rigid for laterally supporting and axially guiding the unit within said supporting structure so that an axial component of load is transmitted to said load sensitive element substantially independent of lateral and eccentric load effects on the unit, means providing a shoulder on said unit between said flexure members and extending laterally from the unit toward the supporting structure, and stop means also disposed between said flexure members and connected to said supporting structure for engagement with said shoulder upon occurrence of a predetermined relative axial movement between said unit and the other end of the load sensitive element.

2. The combination set forth in claim 1 further characterized in that the stop means comprises an annular member encircling the unit.

3. A load weighing device comprising, in combination, a base, a hollow supporting structure having a lengthwise axis which extends substantially at right angles to the base and connected thereto for transmitting a force in such axial direction, an axially extending load transmitting unit spaced from said base, a load sensitive element having ends that are relatively axially movable in response to load, said ends respectively having load transmitting connection with said base and unit to transmit axial force from one to the other, whereby the sensitive element is operated in accordance with load acting on said unit and on the other end of the load sensitive element, a plurality of axially spaced flexure members operatively connected to said supporting structure and to said unit, said flexure members being axially flexible but relatively radially rigid for laterally supporting and axially guiding the unit within said supporting structure so that an axial component of load is transmitted to said load sensitive element substantially independent of lateral and eccentric load effects on the unit, means providing upper and lower lateral shoulders on said unit between said flexure members and extending laterally from the unit toward the supporting structure, and means also disposed between said flexure members and connected to said supporting structure for engaging said upper and lower shoulders upon occurrence of a predetermined relative axial movement in either axial direction between said unit and the other end of the load sensitive element, thereby to provide a safety limit for either tension or compression loads.

4. A load weighing device comprising, in combination, a base, a hollow supporting structure having a lengthwise axis which extends substantially at right angles to the base and connected thereto for transmitting a force in such axial direction, an axially extending load transmitting unit spaced from said base, a load sensitive element having ends that are relatively axially movable in response to load, said ends respectively having load transmitting connection with said base and unit to transmit axial force from one to the other, whereby the sensitive element is operated in accordance with load acting on said unit and on the other end of the load sensitive element, a plurality of axially spaced flexure members operatively connected to said supporting structure and to said unit, said flexure members being axially flexible but relatively radially rigid for laterally supporting and axially guiding the unit within said supporting structure so that an axial component of load is transmitted to said load sensitive element substantially independent of lateral and eccentric load effects on the unit, means providing a shoulder on said unit between said flexure members and extending laterally from the unit toward the supporting structure, stop means also disposed between said flexure members and connected to said supporting structure for engagement with said shoulder upon occurrence of a predetermined relative axial movement between said unit and the other end of the load sensitive element, said unit including a sleeve and center member fitted together, the center member being connected to the load sensitive element to transmit a load force thereto and the plurality of flexure members being secured at their inner ends to said sleeve; and said hollow supporting structure being divided into an upper part containing said flexure members, unit and stop means, and a lower part containing the load sensitive element; and an annular member for aligning said upper and lower parts of the casing, the upper end of said aligning member being seated against the outer edge of the lower flexure member to hold it in position.

References Cited in the file of this patent

UNITED STATES PATENTS

| | | |
|---|---|---|
| 2,414,161 | Moore | Jan. 14, 1947 |
| 2,440,706 | Tint | May 4, 1948 |
| 2,576,417 | Ruge | Nov. 27, 1951 |